United States Patent [19]

Johnson et al.

[11] 3,808,405

[45] Apr. 30, 1974

[54] SYMMETRICALLY ENCODED LABEL FOR AUTOMATIC LABEL READING SYSTEMS

[75] Inventors: Edwin A. Johnson, Clarkston; Ronald P. Knockeart, Walled Lake; Frank A. Russo, Farmington, all of Mich.

[73] Assignee: The Bendix Corporation, Southfield, Mich.

[22] Filed: July 19, 1972

[21] Appl. No.: 273,083

[52] U.S. Cl. .................... 235/61.12 N, 340/146.3 Z

[51] Int. Cl. ........................ G06k 7/10, G06k 19/06

[58] Field of Search ............235/61.12 R, 61.12 N, 61.12 M, 235/61.11 R, 61.11 D, 61.11 E; 250/219 D; 179/100.2 A; 340/174.1 H, 146.3 Z

[56] References Cited

UNITED STATES PATENTS

| | | | |
|---|---|---|---|
| 3,636,317 | 1/1972 | Torrey | 235/61.11 E X |
| 3,643,068 | 2/1972 | Mohan et al. | 235/61.12 N X |
| 3,200,373 | 8/1965 | Rabinow | 340/146.3 H |
| 3,581,064 | 5/1971 | Palmer | 235/61.11 D |
| 2,612,994 | 10/1952 | Woodland et al. | 235/61.11 E |
| 2,975,285 | 3/1961 | Palmer | 235/61.11 E |

FOREIGN PATENTS OR APPLICATIONS

| | | | |
|---|---|---|---|
| 1,225,104 | 3/1971 | Japan | 235/61.11 D |

OTHER PUBLICATIONS

IBM Technical Disclosure Bulletin, Kistner, "Disk—Shaped Unit Record," Vol. 8, No. 1, June 1965, p. 159, 160.

*Primary Examiner*—Thomas J. Sloyan
*Attorney, Agent, or Firm*—Lester L. Hallacher

[57] ABSTRACT

A label which is configured to carry a high density of binary coded information is described. The label is configured to have at least one axis of symmetry through the coded data carrying area. Coding is achieved by alternately arranged segments which have different energy reflective capabilities. By changing the coding on opposite sides of the axis of symmetry, an increased volume of data can be encoded onto a signal label. Thus, if a label of circular configuration is symmetrically encoded about a single diameter each semi-circular portion of the label will carry different information and the amount of data carried in the fixed area of the label is doubled over that which can be carried by a uniformly encoded label.

9 Claims, 4 Drawing Figures

SYMMETRICALLY ENCODED LABEL FOR AUTOMATIC LABEL READING SYSTEMS

CROSS REFERENCE TO RELATED APPLICATIONS

The invention described herein is an improvement over the label described in U.S. Pat. application Ser. No. 207,206 filed Dec. 13, 1971 by Frank A. Russo and Ronald P. Knockeart entitled "Coded Label for Automatic Reading Systems," and assigned to the assignee of the instant application.

U.S. Pat. application Ser. No. 207,150 filed Dec. 13, 1971 by Frank A. Russo and Ronald P. Knockeart entitled "Label Reader Logic Circuitry" describes logic which can be employed with the inventive label and assigned to the assignee of the instant application.

U.S. Pat. application Ser. No. 207,036 filed Dec. 13, 1971 by Ronald P. Knockeart entitled "Narrow Bend Optical System" describes a scanning system which can be employed with the inventive label.

BACKGROUND OF THE INVENTION

Various types of automatic label reading equipment are presently available commercially and are well described in the patented art. Usually, automatic label reading equipment includes a label which has alternate areas of reflectivity, such as black and white, and the label is scanned by a light source so that the reflected light is modulated in accordance with the reflecting capability of the segmented label. The identification of the container upon which the label is placed is then determined by the coded information present in the label. The coded information is dependent upon the arrangement and the width of the black and white segments of the label.

Although some systems have met with limited commercial success, the presently available systems suffer certain deficiencies which have prevented them from having wide utilization throughout industry and for a wide variety of purposes. One limitation stems from the fact that, ordinarily, the coded information is dependent upon the widths of the segments of the label, that is, a narrow width could indicate a logic ZERO and a wider width could indicate a logic ONE. In this type of system, the information is encoded on the label simply by properly arranging the narrow and wide segments, and the differences in reflectivity of the segments is utilized only as a means of separating the segments.

This type of system is disadvantageous because the widths of the segments is the critical code determining characteristic. Because of this feature such a system is sensitive to both distance between the scanning mechanism and the label, and also the skew of the label, which causes the label to be angularly scanned. This is so because, as the scanning distance varies the apparent widths of the segments varies, and therefore it is possible for a narrow segment to appear as a wide segment at short distances and for a wide segment to appear as a narrow segment at a far distance. Skew apparently changes widths because, as the angle of scan through the label increases the distance across each segment scanned also increases, thereby possibly making a narrow segment appear to be a wide segment.

In another type of automatic label reading system, the reflectivity of each segment is used directly to indicate the logic state, that is, a dark segment could indicate a logic ZERO and a light segment could indicate a logic ONE. This type of system is disadvantageous because it is very difficult to distinguish dirt spots and faded spots and other types of noise from the encoded information, and therefore inaccuracies frequently occur in the system. Furthermore, if the code requires adjacent segments of the same reflectivity it is very difficult to separate segments.

Both of the types of systems described hereinabove also suffer the deficiency of making it very difficult to determine when the scanning of the label has been initiated and when it has been terminated. The accuracy of the system is therefore adversely affected because, in many instances the scanning which occurs prior to reading the label appears as dark and light spots because of the inherent reflective characteristics of the object upon which the label is placed. Furthermore, it is frequently difficult to tell when scanning of the label has been terminated for this same reason. As a consequence, the erroneous identification of objects containing the labels is very possible and frequently occurs.

Most prior art lebels are rectangular and thus are sensitive to skew and can not be read accurately when the scanning energy beam is skewed with respect to the transverse dimension of the coded segments. This problem is solved by the circular label described in U.S. Pat. application Ser. No. 207,206 fully identified hereinabove. The label described in the abovereferenced patent application consists of a set of concentric rings with alternate rings having different energy reflective capabilities. The rings also have two different widths and all wide rings have substantially the same width and all narrow rings have substantially the same width. Information is encoded onto the label by grouping the concentric rings into pairs, hereinafter called "digital pulse pairs," so that each pair contains a ring of both widths and a ring of both energy reflective capabilities. Each of these digital pulse pairs defines a digital ONE or ZERO depending upon the reflective capability of the widest ring. Thus, for example, a digital pulse pair of segments which has a wide drak ring and a narrow light ring could define a logic ONE while a digital pulse pair which has a wide light ring and a narrow dark ring could define a logic ZERO. Obviously, if desired, this convention can be reversed.

The circular label described in the co-pending application is very advantageous because it is totally insensitive to skew angle. However, it requires two rings for each pulse bit, (logic ONE or logic ZERO) and thus, depending upon the volume of information which must be encoded onto the label the label becomes unduly large and cannot be used on small items, or in some areas where space restrictions exist but a large volume of information is required.

SUMMARY

The inventive label overcomes the disadvantages of the prior art lebels because it is totally insensitive to skew and also because it permits the encoding of a high volume of information into a relatively small area. The capability of encoding a high volume of information into a small area is achieved by symmetrically dividing the circular label into a plurality of sections so that each section contains different encoding. Thus, for example, if the circular label is divided by a single diameter the concentric semi-circular rings in one-half of the label can be coded to indicate one set of digital information (logic ONE's and ZERO's) and the coding of the concentric semi-circular rings in the other half of the label used to indicate a different set of digital information. Hence, by encoding the two different semi-circular portions of the divided label differently the amount of information encoded onto the label is double.

Because the label is divided along a diameter scanning occurs along a line which is either parallel or perpendicular to the dividing diameter, obviously scanning can also occur along a line which is at any angle between these two extremes. However, because of the symmetry of label, and other provisions of the label discussed hereinafter, it is nonetheless possible to accurately read the label. When scanning occurs parallel to the dividing diameter the same information is received twice with the information received in the last half of the scan being in the reverse order from that received in the first half of the scan. When scanning occurs perpendicular or otherwise non-parallel to the dividing diameter, the information received during the two halves of a single scan is different and a single scan includes all the information encoded onto both halves of the label.

The inventive label described herein is accordingly advantageous over prior art systems because it provides provision for determining whether scanning has occurred perpendicular or parallel to the diameter about which encoding is changed and permits accurate reading of the label irrespective of the scanning angle with respect to the dividing diameter.

The inventive label is also advantageous because it includes provision for indicating when the center of the label has been scanned so that partial label scans which could accidentally appear as valid scans are rejected. This is accomplished by the use of a center portion which must be scanned in order for information from the label to be in the proper coding sequence.

Additional reliability is attained by selected dimensioning of the segments which start and end each half of the label so that scans which appear to pass through the center portion but do not actually do so are indicated as invalid.

DETAILED DESCRIPTION

Figure 1:
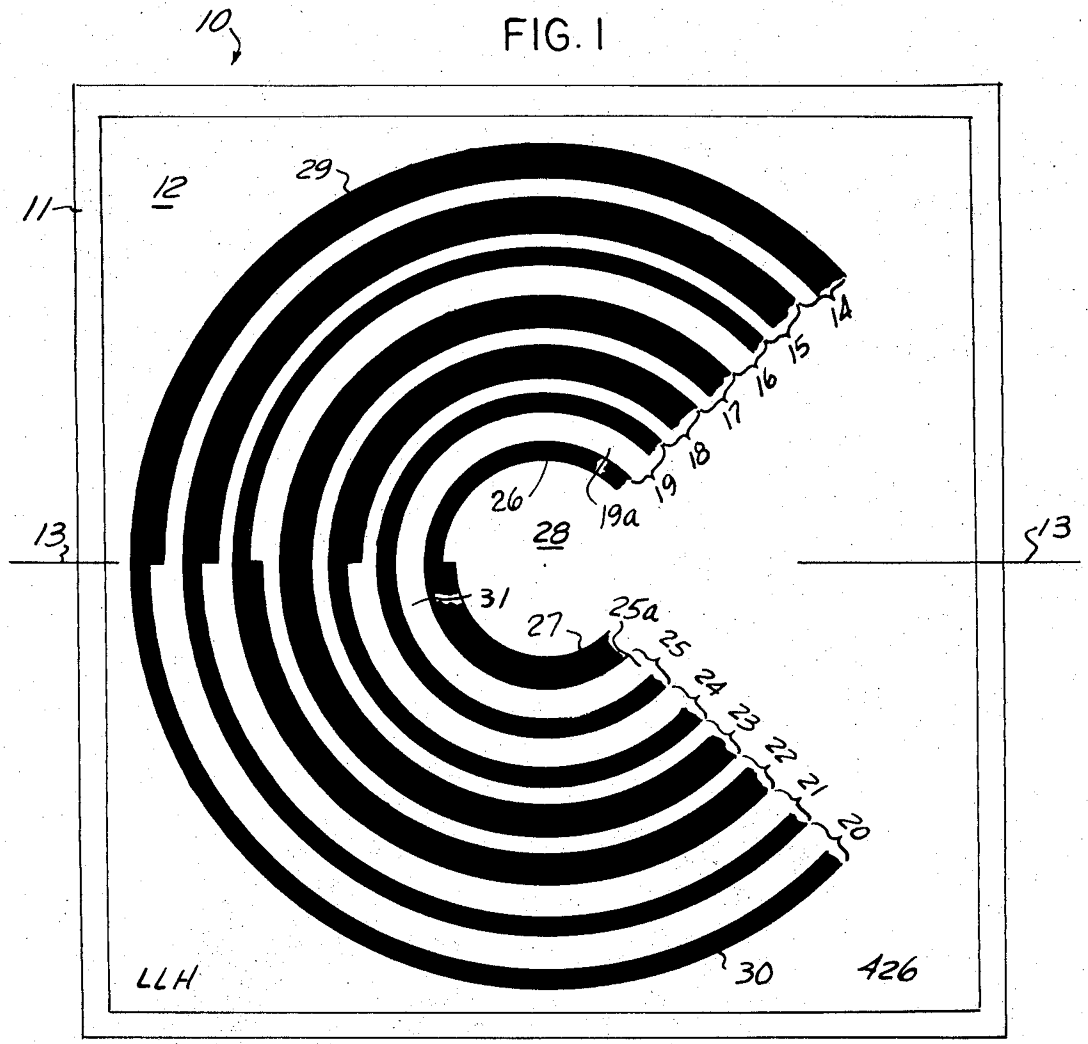
FIG. 1 is a first preferred embodiment of the invention in which a circular configuration contains two data areas.

The label shown in FIG. 1 consists of a set of concentric black rings printed upon a white background to form a series of concentric dark and light segments very similar in appearance to a target. It should be noted that as used throughout this application white and black are respectively synonymous with high reflective capability and low reflective capability. Accordingly, color combinations other than black and white can be used, the only requirement being that the reflective capability of the color combination used be different so that reflected energy of different amplitudes is received from the various segments of the label. Obviously, energy absorbing capability can be referred to in place of energy reflecting capability. Also, the scanning energy of the preferred embodiment described herein contemplates scanning with light from a laser source; however, other light sources, and other types of energy, such as microwave and acoustic, can be used within the scope of the invention.

The label includes a Border 11 which has a reflective capability which is substantially different from that of Background 12 upon which the information is coded so that energy reflection from Border 11 is easily distinguishable from that of the other portions of Label 10. Border 11 can be used to indicate that scanning of the label is initiated and terminated to thereby separate the label from the background environment. This can be accomplished by utilizing the substantially different signal received from reflective Border 11, which because of the different reflective capability will be the highest or lowest signal received, to indicate when scanning of the label starts and stops so that no information occurring before and after Border 11 is processed.

In FIG. 1 a portion of the label is shown removed for convenience in referring to the coded segments. However, it should be understood that the label is symmetrical about a Diameter 13 and that the segments on the two sides of Diameter 13 are different so that two coded informational areas are carried by the single Label 10.

Coding of the label is effected by the utilization of pairs of segments so that each pair represents either a logic ONE or ZERO. Each pair of segments thus defines a "digital pulse pair." This is illustrated by the pairs of segments 14 through 25. As will be explained hereinafter, Digital PUlse Pairs 14 and 20 have special utility useful in assuring correct reading of the label. Each of the Digital Pulse Pairs 14 through 25 contains two segments, or semi-circles. Every digital pulse pair contains one dark and one light segment, as well as one wide and one narrow segment. All of the wide segments are substantially the same width and all of the narrow segments are substantially the same width. Accordingly, all of the Digital Pulse Pairs 14 through 25 are substantially the same width when measured along a radius of the label. The logic condition indicated by each of the digital pulse pairs is dependent upon the reflective capability of the widest segment within that pair. For example, Digital Pulse Pair 14 contains a wide low reflective (dark) segment and a narrow high reflective (light) segment, accordingly this pair could indicate a logic ONE condition. Similarly, Digital Pulse Pair 16 contains a narrow low reflective (dark) segment and a wide high reflective (light) segment and therefore this data pair could indicate a logic ZERO condition. Obviously if desired, the choice of logic indication can be reversed. By utilizing this coding, Digital Pulse Pairs 14 through 19 respectively read 110110 and Digital Pulse Pairs 20 through 25 respectively read 001100 Hence, each half of Label 10 carries six digits of information. However, only the inner five digits of each half of the label are used as informational digits. The outermost digit of each half is used to assure accurate reading of the label. If desired, BCD or other binary coding can be used and obviously any number of digital pulse pairs can be encoded on each half of the label. In any event, a substantial amount of information can be encoded on each half of the label, and twice the information is possible than is possible with an undivided label The innermost Digital Pulse Pair 19 is followed by a Dark Segment 26 and the innermost Digital Pulse Pair 25 of the other half of the label is followed by a Dark Segment 27. The Dark Segments 26 and 27 cooperate to form a dark ring around a Light Bullseye 28. The diameter of Center 28 is wider than the widest white segment of the digital pulse pairs and Center 28 is used to separate the data received from the two halves of the label, and also to indicate that the center of the label has been scanned so that only accurate information is processed. Segments 26 and 27 therefore form a Data Separation Circle which cooperates with Center 28 to separate the information carried by the two halves of the label.

As illustrated in FIG. 1, Data Separation Segments 26 and 27 have different widths with Segment 26 being equal in width to the narrow segments of the digital pulse pairs, and Segment 27 being equal to the wide segments of the digital pulse pairs. It should also be noted that Dark Segment 29 which forms the outermost periphery of the upper-half of the label is wide, while Dark Segment 30 which forms the outermost periphery of the lower-half of the label is narrow. Accordingly, the upper-half of the label starts with Wide Dark Segment 29 and ends with Narrow Dark Segment 26 while the lower-half of the label starts with Narrow Dark Segment 30 and ends with Wide Dark Segment 27. The use of different width segments to start and end each half of the label is a matter of choice as equal width segments can be used. However, after a convention is selected it must be followed for all halfs of all labels. The use of segments of known widths to begin and end each half of the label is used as a mechanism for insuring that all coded segments of both halves are scanned.

Segment 29 is wide and dark and therefore Digital Pulse Pair 14 defines a logic ONE. Segment 30 is narrow and dark and therefore Digital Pulse Pair 20 defines a logic ZERO. This feature helps separate the scanned data. For example, if the first pulse received is a ONE and last pulse received is a ZERO, it is known that both halves of the label were scanned. Also, if the first and last pulses are the same, it is known that scanning occurred substantially parallel to Diameter 13 and only half the label was scanned. For this reason the outermost Digital Pulse Pairs of the two label halves are always different. Furthermore, the top half of all labels always begins with a logic ONE and the bottom half with a logic ZERO so that the direction of scanning is known. Accordingly, if a label is scanned starting with Pulse Pair 20, the appearance of logic ZERO as the first pulse immediately indicates the direction of scanning and the label validly read.

Center 28 and the use of different segment widths as the innermost segment for each half of the label cooperate to yield a positive indication that all coded segments are scanned and also to separate the data received from different coded areas of the label. A positive indication that a valid scan has taken place is obtained because the first half of the scan starts and ends with dark segments of different widths followed next by white Center 28 and the differently dimensioned dark segments which begin and end the second half of the label. The combination of these features is advantageous because a partial scan can occur which appears to pass through Center 28 but which does not actually do so. For example, a vertical scan can pass through the Innermost White Segment 31 without intercepting either Dark Segment 26 or 27. Such a scan could cut a cord across Segment 31 which would be substantially equal in length to the diameter of Center 28. This would not cause confusion since all of the data including Dark Segment 26 or 27 has not been scanned.

The use of the different width dark segments at the beginning and end of each half of the label and at the outermost segment of each half of the label is instrumental in increasing reading reliability in another manner. A scan can occur along a line only slightly skewed with respect to Diameter 13 such that it passes through Segment 29, Segment 26 Center 28, Segment 26 again, and then some coded segments of the top half and some coded segments of the bottom, and then Segment 30. Such a scan would be invalid and would be indicated as such because the information following Center 28 would begin and end with a narrow dark segment (Segments 26 and 30).

It is now apparent that a distinct advantage of the inventive label is the utilization of different width segments as the outermost segment of each half, and the use of innermost segments for each half which are different from one another and also different from the outermost segment of the corresponding half.

The angle of scan across label 10 will be determinative of the order in which data is received from the label. For example, if scanning occurs along a line parallel to Diameter 13, all the data received from all scans through Center 28 will be from the same half of the label. Thus, assuming the top half of the label as illustrated in FIG. 1 is scanned the same digital pulse pairs will be scanned and the same information will be received twice. However, the information received from the second one-half of the scan will be in reverse order from the information received during the first half of the scan. In this instance, the diameter of Center 28 is important in separating the data received from the two halves of the scan. As explained hereinabove in reference to a scan perpendicular to Diameter 13, the difference in widths of Outer Segment 29 and Inner Segment 26 is important in indicating valid scans parallel to Diameter 13 because such a scan could pass through a light segment along a cord having a length substantially equal to the diameter of Center 28 but actually miss Center 28. However, such a scan would begin and end with the same width dark segments thereby indicating that the scan is incomplete. The other half of the label is scanned below diameter 13 and here again the diameter of Center 28 and difference in widths of Segments 27 and 30 is important in indicating valid scans. It should be noted that a small number of scan lines which lie directly on Diameter 13 may be confused and unreadable because of the difference in segment widths along this line. However, these scan lines cause no problem in the operation of the system because they can easily be rejected by the processing circuitry.

It should now be evident that valid data is received from the label irrespective of the angle of scan with respect to Diameter 13. Scanning the label parallel to Diameter 13 yields the same information (in reverse order) for both halves of the scan, while all other angular orientations of the scan line with respect to Diameter 13 yields different information to each half of the scan. However, irrespective to the angle of scanning all coded areas of the label are scanned and, therefore, the inventive label is totally insensitive to skew. Processing circuitry which can be used with the inventive label with only minor modifications is fully described in U.S. Pat. application Ser. No. 207,150 fully identified hereinabove. Furthermore, other types of processing circuitry can be utilized including the proper programming of a computer so that hardwired systems are not necessarily required. Thus, the logic circuitry used in processing the data received from reading the label is within the purview of those skilled in the art and details thereof need not be presented herein.

The logic pulses received from each half the label can be used to code various identification numbers or letters which are indicative of the contents of the container carrying the label. For example, if the label is used for automatic shipping purposes the logic information could direct the destination of and contents of the package. Visual identification can be made by placing the information coded onto the label into the corners of the label as indicated by the numbers 426 and letters LLH shown in the corners of Label 10 of FIG. 1. Furthermore, the type of coding used can be straight binary coding, BCD or any other type of digital coding desired.

Scanning of the label can be effected by the use of a laser and a rotating prism which causes a large number of scans across a label in a very short period of time. Details of a system which can be utilized in scanning the inventive label are presented in U.S. Pat. application Ser. No. 207,036 fully referenced hereinabove. Although scanning with a laser beam is described, other types of energy, such as microwave, infrared and acoustic can be employed within the purview of those skilled in the art.

Because a very rapid scanning of the label occurs, the label can be read automatically even while affixed to a moving object such as a box along a conveyor. However, because several scans through Center 28 must occur before valid data is received, the permissible speed of the moving object which can be identified by the inventive label described herein is limited by the diameter of Center 28. Accordingly, as the speed of the object to be identified is increased the diameter of Center 28 must also be increased. Obviously, increases in the diameter of Center 28 also results in an increase of the diameter of the entire label and if space considerations are important such an increase can be detrimental. The label configuration shown in FIG. 2 can be employed to read fast moving objects without increasing all dimensions of the label. This is accomplished by elongating the label to increase one dimension of Center 28 but not the other dimension of the label. This results in an increase in one dimension of the label but not the other and therefore a substantial space saving is realized over increasing all dimensions of the label.

Figures 2, 3, 4:
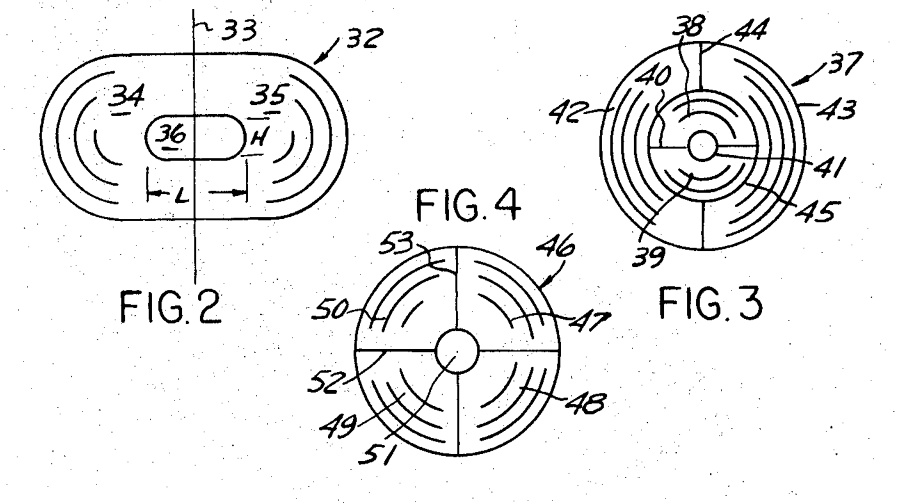
FIG. 2 is a second preferred embodiment of the invention in which an elongated configuration contains two coded areas.
FIG. 3 is a third preferred embodiment of the invention in which a circular configuration has four coded areas.
FIG. 4 is another preferred embodiment of the invention in which a circular configuration has four coded areas.

The elongated label of FIG. 2 is insensitive to skew and need not be particularly orientated on the container. If the orientation is such that scanning occurs parallel to Axis 33 both halves of the label are scanned for a longer period of time and thus fast moving objects can be read. If the orientation is such that scanning is perpendicular to Axis 13 both halves are scanned for all scans passing through Center 36 and hence faster moving deflects can be identified.

A label configuration having four coded areas is illustrated in FIG. 3. The Label 37 of FIG. 3 is configurated to have two Innermost Coded Areas 38 and 39 symmetrically arranged about an Axis 40. It should be understood that the portion of Label 37 defined by Coded Areas 38 and 39 and Center 41 are identical to the label illustrated in FIG. 1. However, additional digital pulse pairs have been added to the label by the addition of Coded Segments 42 and 43. Segments 42 and 43 are symmetrical about an Axis 44 so that the coded information contained within Coded Areas 42 and 43 is different. Axis 44 preferably is perpendicular to Axis 43 so that three of the four Data Areas 38, 39, 42 and 43 are scanned during each scan of Label 37. Irrespective of the angle of scan, all four of Coded Areas 38, 39, 42 and 43 will be scanned during the scanning of all of Center 40. Because each pair of additional segments defines a logic pulse and because the two additional segments can be different in Areas 42 and 43, the addition of two segments around the entire label results in two additional pulses of information from the label. Furthermore, because the additional Coded Areas 42 and 43 are symmetrical about a different axis the data is encoded into four separate areas which can be convenient for some purposes. Obviously, any number of segment pairs can be added to the label in the manner illustrated in FIG. 3 the only constraint being the maximal permissible diameter of the entire label. It should be noted that the Dividing Segment 45 which separates the outer two Coded Areas 42 and 43 from the inner two Coded Areas 38 and 39 is configured and dimensioned to serve the same functions as Segments 26 and 27 and Center 28 of the label configuration illustrated in FIG. 1.

FIG. 4 shows another label configuration which contains four Coded Areas 47, 48, 49 and 50. This label can best be understood by referring again to FIG. 1 and dividing the top and bottom halves of this label each into two halves or coded areas, each of which contains different information. Thus, the four coded informational Areas 47, 48, 49 and 50 are formed about a Center 51 with the dividing segments between the coded areas and Center 51 being dimensioned in accordance with the dimensional considerational considerations fully described hereinabove with respect to Segments 26 and 27 of FIG. 1. The different widths of start and end segments of each coded area and the dimensioning of Center 28 are also followed for Label 46. The label configuration illustrated in FIG. 4 is particularly useful if the label is affixed to objects which must be identified while rolling. In this instance the angle of scan with respect to the label would rotate about the label as the container rotates and therefore all data segments of the label would be read. However, if the label is to be read when attached to a non-rolling item it is necessary to affix the label so that scanning occurs in a direction which is substantially perpendicular to either Axis of Symmetry 52 or 53. Thus, assuming that scanning occurs substantially parallel to Axis 53, Data Segments 47 and 48 would first be read and Data Segments 49 and 50 would be read after crossing Axis of Symmetry 53. The requirement for scanning substantially parallel to one of the axes of symmetry negates the advantage of complete skew insensitivity. Accordingly, full realization of the advantage can be gained by using two scanning mechanisms which scan at right angles to one another. Also if desired, a single scanner can be used and the scan line rotated in space through a 90° angle. It should now be evident that the label configuration illustrated in FIG. 4 carries twice the amount of data as that illustrated in FIG. 1 and four times the information as an undivided label.

If desired, the number of coded areas can be increased by increasing the number of dividing axes. Thus for example three or four equiangularly spaced axes can be used to obtain six or eight coded areas. The data capacity of the label can be substantially increased by using n equiangularly spaced axes to divide the label into 2n differently coded areas without increasing the dimensions of the label. In such a label the width of the outermost segments of the coded areas would alternate so that only two segments would be required. Also, the innermost segments widths would alternate so that the advantages of different start and stop segment widths discussed above would be realized. Such labels can be read by rolling the object being read or else by rotating the scanning line. Rotation of the scanning line can be effected by the use of a rotating prism or by other means within the purview of those skilled in the art.

What is claimed is:

1. A skew insensitive substantially circularly configured label coded with a plurality of concentric logic indicating segments, radially adjacent segments having different radial widths and different energy reflective capabilities and said segments being grouped into pairs so that the logic indication of each pair is defined by the reflective capability of the radially widest segment comprising:

at least one axis of symmetry completely traversing said label and dividing said segments into $2n$ coded areas of substantially equal arcuate extent where n is the number of axes of symmetry, said segments having similar configurations and being configured as concentric circular portions having an arcuate extent equal to $360/2n$, and each of said coded areas having a different arrangement of segments so that different information is contained in each of said areas;

a circle of symmetry at the center of said label, said segments being concentrically disposed about said circle of symmetry, and said at least one axis of symmetry passing through the center of said circle of symmetry.

2. The label of claim 1, wherein the outermost segment of adjacent coded areas have different widths and wherein the outermost and innermost segment of each coded area are different in width and have the same reflective capability.

3. The label of claim 1 wherein said segments are alternately arranged in accordance with said reflective capability so that the outermost segment of each of said pairs has one of said reflective capabilities;

said label further including a coded area ending segment, said coded area ending segment separating said digital pulse pairs from said circle of symmetry, and having a segment width different from the width of the outermost segment of said coded area.

4. The label of claim 3 wherein said at least one axis of symmetry is a single diameter of said label, and said segments are concentric semi-circles disposed about said circle of symmetry.

5. The label of claim 4 further including a border surrounding said label, said border having a reflective capability substantially different from the reflective capabilities of said segments so that said border separates said label from the environment.

6. The label of claim 4 wherein the outermost segment of adjacent coded areas have different widths and wherein the outermost and innermost segment of each coded area are the same width and have the same reflective capability.

7. The label of claim 3 wherein said label includes two perpendicular axes of symmetry so that said label includes four of said coded areas.

8. The label of claim 3 wherein said label includes additional coded areas, said additional coded areas being concentrically disposed about the outermost segment of said two coded areas and being separated by a second axis of symmetry perpendicularly disposed with respect to said one axis of symmetry.

9. The label of claim 3 wherein the outermost segment of adjacent coded areas have different widths and wherein the outermost and innermost segment of each coded area are different in width and have the same reflective capability.

* * * * *